United States Patent [19]

Dahn et al.

[11] Patent Number: 5,498,493
[45] Date of Patent: Mar. 12, 1996

[54] ELECTRON ACCEPTOR SUBSTITUTED CARBONS FOR USE AS ANODES IN RECHARGEABLE LITHIUM BATTERIES

[75] Inventors: Jeffrey R. Dahn, Surrey; Brian M. Way, Coquitlam, both of Canada

[73] Assignee: Moli Energy (1990) Limited, Canada

[21] Appl. No.: 118,942

[22] Filed: Sep. 9, 1993

[30] Foreign Application Priority Data

Jun. 11, 1993 [CA] Canada ................................ 2098248

[51] Int. Cl.⁶ .................................................. H01M 4/02
[52] U.S. Cl. .......................... 429/218; 429/197; 429/213; 429/218
[58] Field of Search ...................... 429/194, 197, 429/213, 218

[56] References Cited

U.S. PATENT DOCUMENTS

| | | |
|---|---|---|
| 4,243,732 | 1/1981 | Powers et al. . |
| 4,302,518 | 11/1981 | Goodenough et al. . |
| 4,423,125 | 12/1983 | Basu . |
| 4,507,371 | 3/1985 | Thackeray et al. . |
| 4,702,977 | 10/1987 | Hiratsuka et al. . |
| 4,725,422 | 2/1988 | Miyabashi et al. . |
| 5,028,500 | 7/1991 | Fong et al. . |
| 5,130,211 | 7/1992 | Wilkinson et al. . |
| 5,139,901 | 8/1992 | Kawaguchi et al. . |
| 5,229,226 | 7/1993 | Bito et al. ............................... 429/194 |
| 5,358,805 | 10/1994 | Fujimoto et al. . |

FOREIGN PATENT DOCUMENTS

| | | |
|---|---|---|
| 0486950A1 | 5/1991 | European Pat. Off. . |
| 0474183A2 | 3/1992 | European Pat. Off. . |
| 62-23433 | 5/1987 | Japan . |
| 1-186555 | 7/1989 | Japan . |
| 2-38343 | 8/1990 | Japan . |
| 5-182668 | 7/1993 | Japan . |

OTHER PUBLICATIONS

Preparation and Characterization of $B_xC_{1-x}$ Thin Films with the Graphite Structure. Way et al. Jul. 15, 1992.

T. Nagaura et al., Progress in Batteries & Solar Cells, vol. 9 (1990), 209–217 (month not available).

Z. X. Shu et al., Electrochemical Intercalation of Lithium into Graphite, J. Electrochem. Soc. vol. 140, No. 4, Apr. 1993, 922–927.

J. Yamaura et al., High voltage, rechargeable lithium batteries using newly–developed carbon for negative electrode material, Journal of Power Sources, 43–44 (1993) 233–239 (month not available).

M. Morita et al., Layered–Structure $BC_2N$ as a Negative Electrode Matrix for Rechargeable Lithium Batteries, J. Electrochem. Soc., vol. 139, No. 5, May 1992, 1227–1230.

C. E. Lowell, Solid Solution of Boron in Graphite, Journal of American Ceramic Society, vol. 50, No. 3 (1967), 142–144 (month not available).

J. Kouvetakis et al., A Novel Graphite–Like Material of Composition $BC_3$, and Nitrogen–Carbon Graphites, J. Chem. Soc. Commun. (1986), p. 1758 (month not available).

J. Kouvetakis, et al., Novel Aspects of Graphite Intercalation by Fluorine and Fluorides and New B/C, C/N and B/C/N Materials Based on the Graphite Network, Synthetic Metals, 34 (1989), 1–7 (month not available).

R. B. Kaner, et al., Boron–Carbon–Nitrogen Materials of Graphite–Like Structure, Mat. Res. Bull., vol. 22 (1987), 399–404 (month not available).

(List continued on next page.)

Primary Examiner—Prince Willis, Jr.
Assistant Examiner—M. Nuzzolillo
Attorney, Agent, or Firm—Lerner, David, Littenberg, Krumholz & Mentlik

[57] ABSTRACT

A battery using carbonaceous materials with a graphite or disordered graphite structure wherein boron atoms are substituted for carbon atoms in the structure. The electrochemical potential of the carbonaceous materials is shifted as a result of such substitution, and the electrochemical capacity is increased. Both effects are desirable for anode materials in lithium ion type batteries.

9 Claims, 5 Drawing Sheets

(-) Stainless Steel Cell Cap
Polypropylene Gasket
Mild Steel Disc Spring
Stainless Steel Disk
Lithium Metal
Separator
Cathode
(+) Corrosion Resistant Stainless Steel Cell Can

OTHER PUBLICATIONS

B. M. Way, et al., Preparation and characterization of $B_xC_{1-x}$ thin films with the graphite structure, Phys. Rev. B, vol. 46, No. 3 (1992), 1697–1702 (month not available).

B. M. Way and J. R. Dahn, Lithium Intercalation in $B_2C_{(1-z)}$ Thin Films, Extended Abstract No. 30, presented at 1992 Fall Meeting of Electrochem. Soc., Toronto, Ontario, Oct. 12–16, 1992.

Robert et al., Lamellar Properties of Graphite, Chemistry and Physics of Carbon 10 1973.

S. Marinkovic, Substitutional Solid Solubility in Carbon and Graphite, Chemistry and Physics of Carbon, 19, 1984 (month not available).

N. Bartlett, et al., Novel Metallic and Semiconductive Graphites, Berkeley Report LBL–22543 (month not available).

B. C. Shen, et al., Synthesis and Characterization of Graphite–Like Boron–Carbon Materials (not known whether published) (month not available).

R. M. Wentzcovitch, et al., α–States Contribution to the Conductivity of $BC_3$, Solid State Communications, vol. 67, No. 5, 515–518 (1988) (month not available).

A. R. Badzian, Cubic Boron Nitride—Diamond Mixed Crystals, Mat. Res. Bull., vol. 16, 1385–1393 (1981) (month not available).

J. R. Dahn, et al., Density of states in graphite from electrochemical measurements on $Li_x(C_{1-z}B_z)_6$, Physical Review B, vol. 45, No. 7, 3773–3777 (1992) (month not available).

J. R. Dahn, et al., Correlation between X–Ray Absorption and Chemical Potential Measurements in Lithium intercalated Carbons, Physical Review Letters, vol. 68, No. 6, 835–838 (1992) (month not available).

ELECTRON ACCEPTOR SUBSTITUTED CARBONS FOR USE AS ANODES IN RECHARGEABLE LITHIUM BATTERIES

FIELD OF THE INVENTION

This invention relates to the field of batteries. In particular, it deals with anode materials useful for rechargeable lithium ion batteries.

BACKGROUND OF THE INVENTION

Rechargeable lithium batteries are becoming increasingly more common in the market place. This is a result of greater demand for higher energy density power sources for electronics applications and of recent improvements in the technology. A new type of battery based on lithium ion (also referred to as "rocking chair") technology was recently made commercially available by Sony Energy Tec (T. Nagaura et al., Progress in Batteries and Solar Cells, 9, 209, (1990)). This system uses two, suitably chosen, intercalation compounds as electrodes each of which acts as a host for lithium. It is thus desirable to select materials that are capable of reversibly intercalating large amounts of lithium per unit host material. Since the battery voltage is determined by the potential difference between the two electrodes, it is desirable to select two materials that differ significantly in potential.

Typically, the cathode in such systems is a lithium transition metal oxide such as $LiCoO_2$ (Goodenough et al., U.S. Pat. No. 4,302,518) or $LiMn_2O_4$ (Thackeray et al., U.S. Pat. No. 4,507,371). These materials reversibly intercalate lithium in a potential range around 3 to 4 volts with respect to lithium metal. The anode material employed is typically a carbonaceous material with a graphite or disordered graphite structure. These materials reversibly intercalate lithium in a potential range mainly within a few hundred millivolts above that of lithium metal.

The use of graphite as an anode material has been disclosed previously in inventions by Sanyo (Japanese published examined patent application No. 87023433) and by Basu (U.S. Pat. No. 4,423,125) amongst others. Highly crystalline graphite offers large theoretical reversible lithium capacity. Herein, we define reversible capacity as the amount of lithium, $\Delta x$, in $Li_{x+\Delta}C_6$ which can be reversibly intercalated over many cycles. It is commonly believed that pure graphite can reversibly intercalate $\Delta x=1$ worth of lithium. This corresponds to 372 mAh/g capacity for the graphite.

Although graphite has excellent capacity properties, difficulties are encountered in its practical application in lithium ion cells. Lithium in all carbonaceous hosts is lost to some extent. This loss of lithium is irreversible, hence it is important that it be minimized. The mechanism for all the losses observed are not completely understood. To some extent, lithium in a carbonaceous anode reacts at the anode surface with the electrolyte used in the battery. When graphite is used as an anode, the irreversible loss, which occurs when many common electrolytes are used, is very large and unacceptable. This is believed to occur in some cases as a result of electrolyte solvent co-intercalating with the lithium into the graphite. The graphite presumably exfoliates when the large solvent molecules co-intercalate, which creates more anode surface area, which in turn increases the amount of lithium which can react with the electrolyte. D. P. Wilkinson et al. (U.S. Pat. No. 5,130,211) disclose the use of a sequestering agent that reduces the irreversible loss of lithium in a graphite anode when incorporated into a propylene carbonate solvent based electrolyte. Shu et al. (J. Electrochem. Soc. 140(4), 1993)) further show the unacceptable behaviour of a pure graphite anode for use in a lithium ion battery using propylene carbonate/ethylene carbonate (50/50 blend by volume) solvent based electrolyte. Addition of a sequestering agent again adequately reduces the irreversible loss of lithium. Matsushita (6th International Lithium Battery Conference, Muenster, Germany, May 13, 1992) reveals an ethylene carbonate based electrolyte that also significantly reduces these irreversible losses of lithium in batteries employing graphite anodes. Thus, there are electrolyte compositions that can be employed to allow practical application of graphite as an anode. Often however these compositions are not desirable for other reasons, including incompatibility with the cathode material, cost, safety, etc. Therefore, it is desirable to obtain at least the specific capacity of graphite in special carbons or in other materials that may not additionally restrict the choice of solvents employed in the electrolyte.

Another difficulty encountered in the practical design of a lithium ion battery results from the small potential difference between the lithiated carbonaceous material and that of lithium metal. During charging of a lithium ion battery, lithium is de-intercalated from the cathode and preferentially intercalates into the anode. If the overvoltages which occur during charge are too large (as a result of charging quickly), electroplating of the lithium may occur instead. Much of any plated lithium is effectively lost as the cycling efficiency of lithium metal is poor, causing a relatively rapid loss in cell capacity. Also, the presence of plated lithium presents an increased safety hazard. Thus, high-rate battery designs are required that result in low anode overvoltages. Of the possible carbonaceous materials for use as anodes, the potential difference between that of lithiated graphite and lithium metal is amongst the lowest.

Other carbonaceous materials can be suitably employed as anodes instead. Mitsubishi Petrochemical (U.S. Pat. Nos. 4,702,977 or 4,725,422) discloses other carbon materials useful as lithium ion battery anodes. Similarly, Moli Energy (U.S. Pat. No. 5,028,500) discloses further carbonaceous anode materials. These materials offer certain advantages over pure graphite that include a greater potential difference with respect to that of lithium metal and the option to use other suitable electrolyte compositions. However, the reversible capacity of these materials is not as great as that of graphite. (Those skilled in the art are aware that a greater potential difference with respect to lithium metal results in a lithium ion battery with lower operating voltage. However, a relatively large increase in the lithiated carbon potential with respect to lithium metal can be achieved with only a relatively small reduction in battery operating voltage. Thus, the energy density of the lithium ion battery is sacrificed only to a small extent in return for a large possible gain in the battery rate capability).

Composite anode materials have recently been investigated wherein the materials mainly consist of carbon but also contain boron to some extent. Sony (Japanese patent application laid open No. 03-245458) discloses the use of a carbonaceous material containing 0.1-2.0% by weight boron as an anode in a rechargeable battery. The addition of varied amounts of boric acid in the synthesis of the material resulted in anodes with differing lithium capacity. A definite but small increase in capacity similar to that of graphite was obtained for a preferred composite anode wherein approximately 1% boron by weight remained in the composite. In this reference, this preferred composite anode attained deliverable capacities on discharge of 380 mAh/g compared to the 310 or 350 mAh/g of the two respective comparative examples shown where no boric acid was used in the preparation. This therefore corresponds to a 23% and a 9% capacity increase with respect to each comparative material shown. According to this reference, an increase in the amount of residual boron (up to 2.5% by weight) results in no gain in capacity. The voltage curves in the figures of this application show no apparent difference in the battery voltage and hence presumably no difference in the potentials between that of the invention example and the comparative example materials.

Several references also appear in the literature that mention composite boron carbon anode materials containing elements from other groups in the periodic table. Central Glass Co. (U.S. Pat. No. 5,139,901) discloses the use of a different anode composite which, in addition to boron, contains nitrogen and hydrogen. The preferred material provides only 97.3 mAh/g of reversible capacity making it relatively impractical for commercial use. Those skilled in the art recognize, from the available prior art, that the potential of carbonaceous materials with respect to lithium metal varies significantly with type of carbon. There is no indication in this patent application of Central Glass Co. that incorporation of boron or any of these other elements in the composite results in a material with a potential that differs from that of a similar carbon prepared without nitrogen or hydrogen. Morita et al. (J. Electrochem. Soc. 139(5),1227, (1992)) discuss the use of $BC_2N$ as an electrode material. The electrode examples exhibited large polarization even at low rate making these electrodes impractical for use in commercial battery products. A substituted structure was postulated and mention is made that the operating potential of $Li_xBC_2N$ is somewhat higher than that of a carbon like petroleum coke. Again, there is no indication that a potential shift with respect to that of a similar carbon prepared without B and N was achieved. Also, in this reference, the higher operating potential of this composite is considered to be a disadvantage. In both these references, the element nitrogen which acts as an electron donor has been included in the composite along with boron. Sony (Eur. Pat. Appl. EP486950) mentions use of a composite carbon anode material that could include phosphorus or boron. However, this was merely a suggestion as a possible anode material and again, phosphorus acts as an electron donor.

Compounds of the form $B_zC_{1-z}$ where boron has been substituted for carbon in the structure have been reported in the literature. As early as 1967, Lowell (Journal of the American Ceramic Society 50, 142 (1967)) Showed that carbons could be doped substitutionally with 2% boron in a high temperature synthesis (2400° C.) involving $B_4C$ and carbon. At these temperatures, no further boron beyond 2.3% atomic can be substituted for carbon. Later work by Kouvetakis et al. (J. Chem. Soc. Chem. Commun. p. 1758 (1986)), Kouvetakis et al. (Synthetic Metals 34, 1 (1989)), and Kaner et al. (Materials Research Bulletin 22, 399 (1987)) described how substantially higher doping levels could be achieved by a low temperature synthesis method. Kouvetakis et al. prepared material which they claim had a stoichiometry of $BC_3$. Further work by the same group showed that sodium could intercalate into these materials. They suggested that boron substituted carbons could be useful as electrodes in lithium batteries, but did not demonstrate any advantages over the prior art. Furthermore, there is no evidence that these boron substituted carbons were ever tested for lithium intercalation, or that any electrochemical cells were constructed.

The inventors (B. M. Way et al. Phys. Rev. B. 46, 1697 (1992)) also confirmed that boron substituted carbonaceous materials can be made with z in $B_zC_{1-z}$ as large as 0.18. No electrochemical data was reported. Further material presented by the inventors (B. Way and J. R. Dahn, extended abstract #30, at the 1992 Fall Meeting of the Electrochemical Society, Toronto, Ontario, Oct. 12–16, 1992) show data for $Li|B_{0.17}C_{0.83}$ cells which show a useful significant shift in potential of the anode material with respect to lithium when the carbon is doped substitutionally with boron. No capacity improvement was shown, however, over that published in the prior art.

SUMMARY OF THE INVENTION

The invention is directed to a method of causing a shift in potential in anode material of a lithium ion battery wherein the electroactive material of the anode comprises a carbonaceous material of a graphite or disordered graphite structure, which comprises substituting electron acceptors for carbon atoms in said structure.

The invention is also directed to a method of causing an increase in the reversible capacity of electroactive material of a lithium ion battery wherein the electroactive material of the anode comprises a carbonaceous material of a graphite or disordered graphite structure, which comprises substituting electron acceptors for carbon atoms in said structure. The electron acceptors can be boron or can be selected from the group consisting of Be, Al, Mg, Ga, and Ca.

The invention pertains to a lithium ion battery comprising: (a) a cathode; (b) an anode wherein the electroactive material of the anode comprises a carbonaceous material of a graphite or disordered graphite structure, with electron acceptors substituted for carbon atoms in said structure; and (c) an electrolyte.

The invention also pertains to a lithium ion battery comprising an anode, a cathode and an electrolyte wherein the electroactive material of the anode comprises a boron substituted carbon of the form $B_zC_{1-z}$, wherein z is a number in the range from greater than zero and less than or equal to about 0.17.

In the battery as described, z can be a number in the range from greater than about 0.08 and less than or equal to about 0.17. The cathode can comprise lithiated transition metal oxides, and the electrolyte can comprise lithium salts in a mixture of propylene carbonate and ethylene carbonate solvents. The lithium salt can be $LiN(CF_3SO_2)_2$.

The invention is also directed to a lithium ion battery comprising a cathode, an anode and an electrolyte wherein electroactive material of the anode comprises a boron substituted carbon of the form $B_zC_{1-z}$, wherein z is a number in the range from greater than zero and less than or equal to about 0.17, and layer spacing (002) of said material as determined by wide angle X ray diffraction is in the range from greater than or equal to 3.37 Å and less than or equal to 3.45 Å, or greater than or equal to 3.37 Å and less than or equal to 3.41 Å.

Boron substituted materials of the form $B_zC_{1-z}$, where z ranges from zero to a maximum of 0.17, were synthesized using a conventional CVD process. In laboratory lithium cells, a steady positive shift in potential of these materials when lithiated was demonstrated as z increases. In addition, reversible capacities increased steadily with increasing z. For z greater than about 0.08, reversible capacities that exceeded that of pure graphite were achieved. Boron substituted carbons so prepared could be used in combination with a non aqueous electrolyte that is unsuitable for use with an anode of pure graphite.

It is expected that similar results might be obtained when substituting other elements that act as electron acceptors in the host carbon. Possible electron acceptors include Be, Al, Mg, Ga, and Ca. Conversely, elements such as N or P would act as electron donors and would not be expected to provide these beneficial results.

BRIEF DESCRIPTION OF THE DRAWINGS

In drawings which illustrate specific embodiments of the invention, but which should not be construed as restricting the spirit or scope of the invention in any way.

DETAILED DESCRIPTION OF SPECIFIC EMBODIMENTS OF THE INVENTION

The inventors have discovered that beneficial effects can be realized by using carbonaceous materials with graphite or disordered graphite structure as anodes wherein elements that act as electron acceptors, such as boron, are substituted for carbon in the structure. The inventors offer the following theory as a possible aid to understanding the phenomenon, but do not wish to be adversely bound in any way by the theory. Carbon has four valence electrons and, for example, boron has 3. Thus boron substituted for carbon in a graphite structure should act as an electron acceptor. That is, there will be fewer electrons than expected in the proximity of the boron atom and it will be ready to accept more since it is incorporated in a compound whose global electronic properties expect 4 valence electrons to be contributed from each atom. When Li is intercalated into the carbon or graphite, it acts as an electron donor, donating its 2s electron to the carbon host. Therefore, the presence of boron should strengthen the chemical bond between the intercalated Li and the boron-carbon host compared to the pure carbon host.

As a result, the potential of the boron substituted carbon is increased versus lithium metal. The increased bond strength and hence potential shift is useful for anode materials employed in lithium batteries. Higher rate operation of batteries made using such materials as anodes is possible since greater overvoltage is required before the onset of lithium electroplating on charge. In addition, the presence of the electron acceptor can lead to higher anode capacity. The shift in potential associated with the substitution allows more total lithium to be intercalated into the anode before the chemical potential of the intercalated lithium matches that of lithium metal (ie. before the anode is full). Reversible capacities that exceed that of graphite can be achieved.

Figure 1:
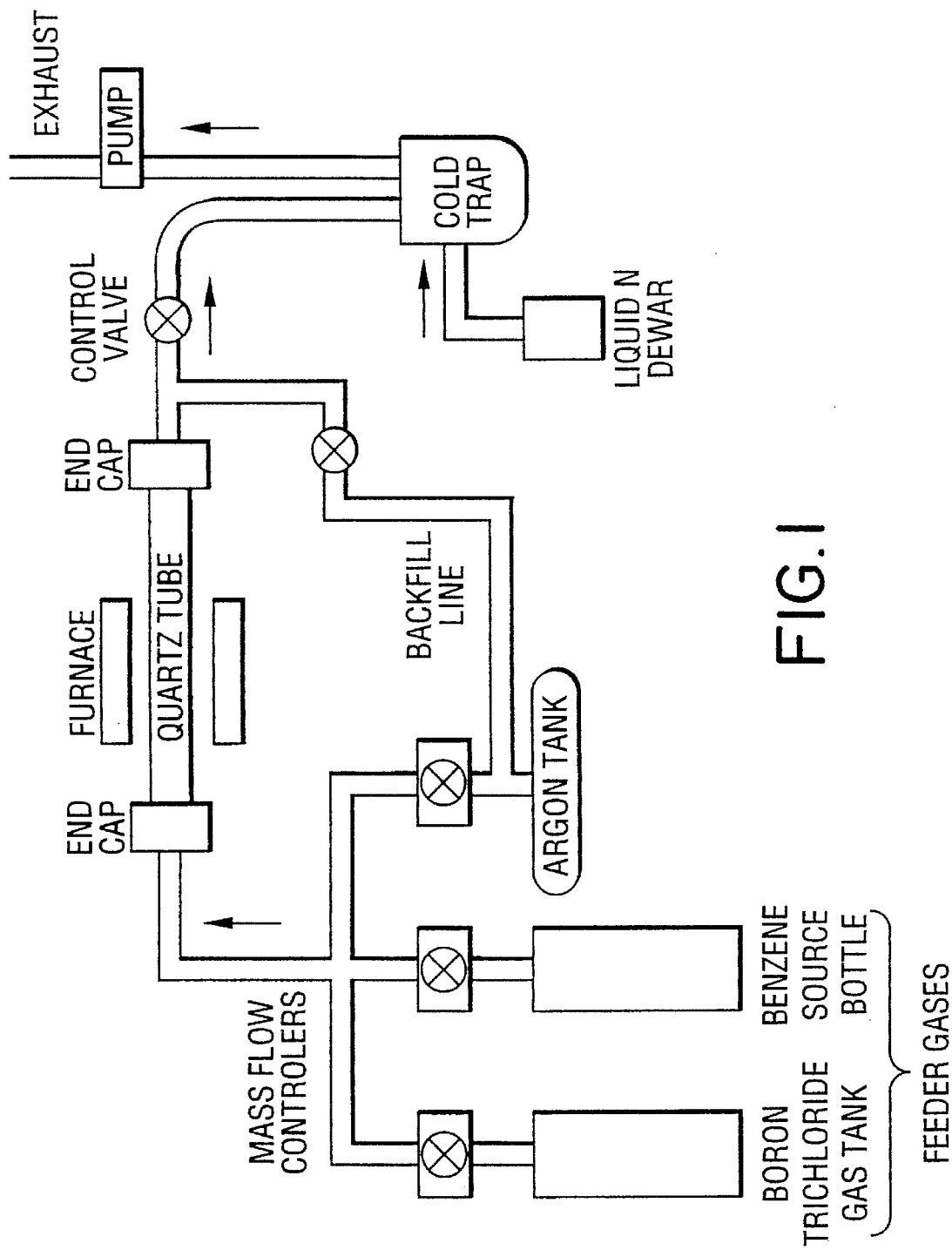
FIG. 1 is a schematic sketch of the CVD reactor system used to synthesize the invention materials.

Boron-carbon materials, $B_zC_{1-z}$ with $0 \leq z \leq 0.17$ can be made in a manner similar to that described in B. M. Way et al. (Phys. Rev. B. 46, 1697 (1992)). Briefly herein, benzene and $BCl_3$ vapour are fed to a heated quartz walled reactor where they are decomposed and allowed to react. The reaction products are $B_zC_{1-z}$, $CH_4$, HCl and other hydrocarbons. The former product is a solid, whose stoichiometry is adjusted by varying the relative flow rates of benzene and $BCl_3$ in the inlet gas stream. FIG. 1 shows a schematic sketch of the reactor system used. If the deposition is allowed to proceed for 5 hours with flow rates near 20 standard cubic centimetres per second for benzene and near 15 standard cubic centimetres per second for $BCl_3$, at a system pressure of 5 torr, and a temperature of 900° C., approximately 1 gram of $B_zC_{1-z}$ material can be subsequently recovered from the quartz reactor walls by scraping with a sharp knife.

The material so prepared consists mainly of boron and carbon. However, small quantities of impurities, in particular, residual hydrogen, may be present. The stoichiometry (boron:carbon ratio) of samples of this material is then roughly determined by Auger electron spectroscopy in accordance with established methods (eg. see L. E. Davis et al., Handbook of Auger Electron Spectroscopy, 2nd Edition, Physical Electronics Division, Perkin Elmer Corporation, Eden Prairie, Minn. USA (1978)). Unfortunately, there is a significant error associated with this method.

The material scraped from the reactor is then powdered in an automatic mortar and pestle and screened through a No. 200 mesh sieve.

Figure 2:
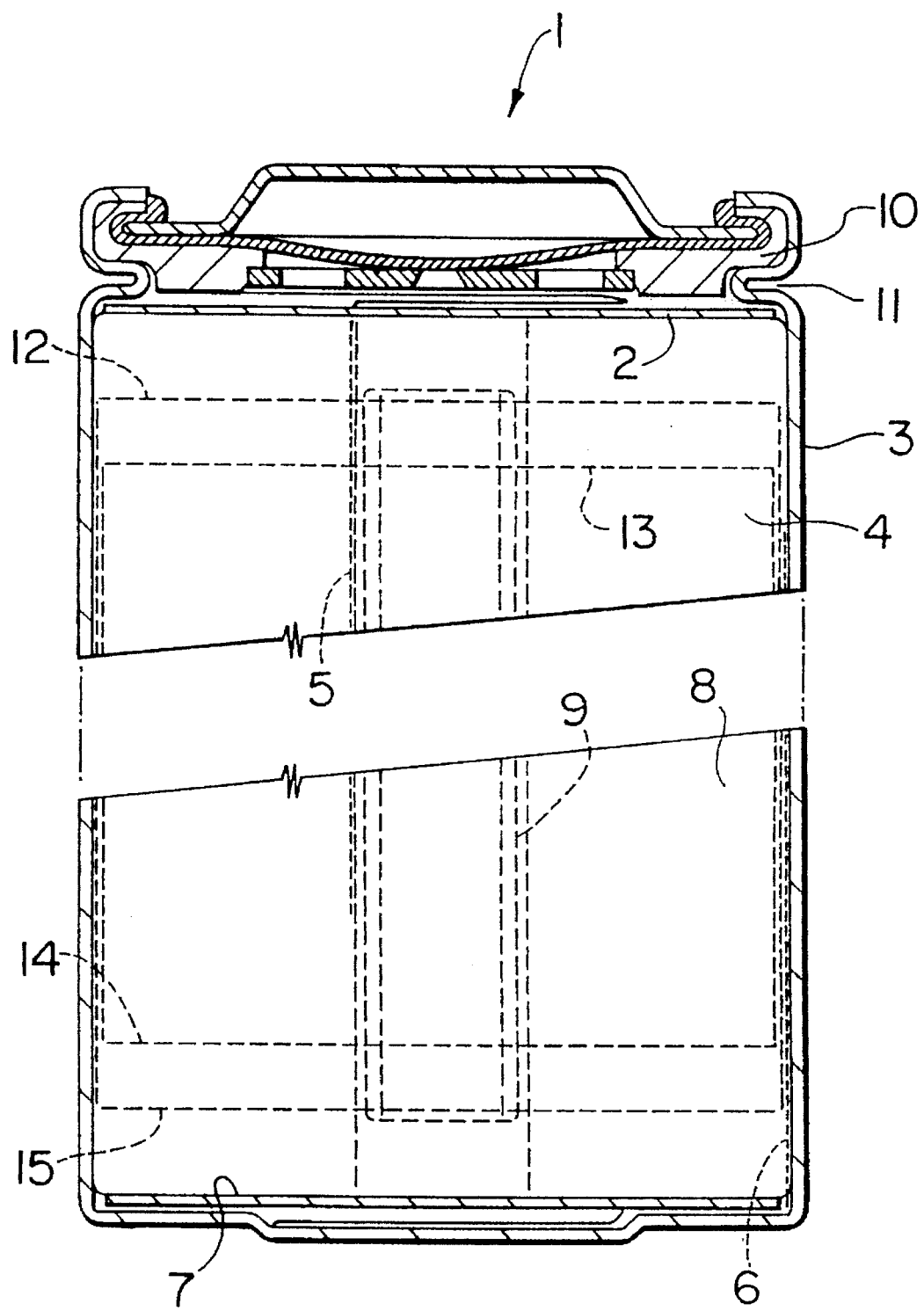
FIG. 2 shows a preferred embodiment of a wound type Li ion battery that employs a boron substituted carbon material in the anode.

Lithium ion batteries are then constructed employing the boron carbon material as an anode material. A preferred construction is that of a wound type battery shown in FIG. 2. Cathode foils are prepared using a lithiated transition metal oxide powder, a binder, and a conductive dilutant mixture applied to a thin aluminum foil. Anode foils are prepared using the invention boron-carbon powder and a binder applied to a thin copper foil. A dry cell assembly is then prepared by spirally winding an anode and cathode segment together into a "jelly roll" with two microporous polyolefin film sheets acting as separators. Typically, anode foils are slightly wider than the cathodes. The "jelly roll" is inserted into conventional cylindrical battery containers. Appropriate insulating pieces are included and tab connections are made to the cell case and header. Safety devices may be included as desired. FIG. 2 shows the use of a combination safety vent and pressure operated disconnect device that may be employed. Electrolyte consisting of a suitable lithium salt in a mixture of non-aqueous solvents is added to activate the battery prior to crimping the header-case assembly shut.

Figure 3:
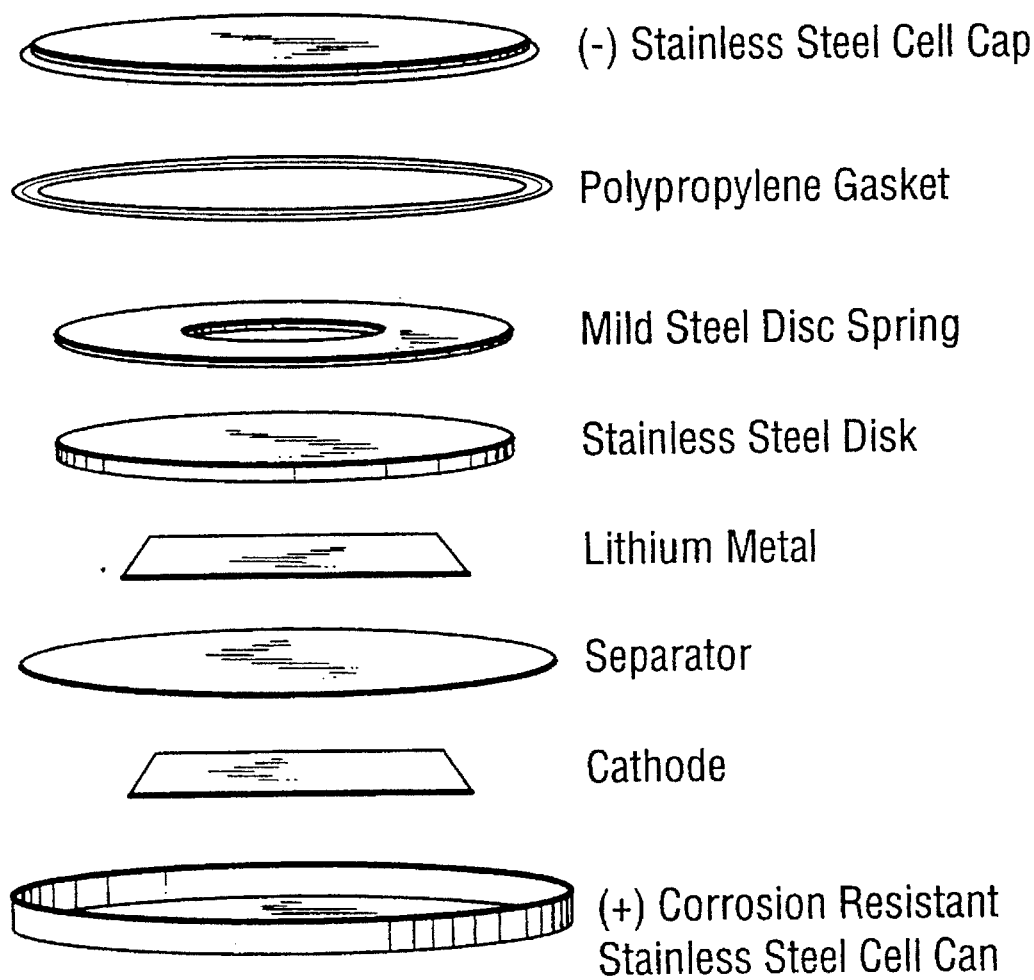
FIG. 3 shows an exploded view of laboratory test cell construction used to determine the electrochemical characteristics of the example materials.

In the examples which follow, the electrochemical behaviour of the invention materials is demonstrated in laboratory test cells. These cells use an anode of lithium metal which acts as the source of lithium and as a reference electrode. Unlike the actual application battery, the invention material is employed as a cathode in these test cells. However, the information provided from such cells allows those skilled in the art to engineer suitable lithium ion batteries using these materials as anodes. FIG. 3 illustrates the general construction of such cells. 2325 size coin cell hardware equipped with a spacer plate and a disc spring was used as the test vehicle. The disc spring was selected such that a pressure of about 15 bar would be applied to each of the cell electrodes when the cell was crimped closed.

To prepare electrodes of the invention material, a slurry is made by mixing the invention powder with a solution of polyvinylidene fluoride (PVDF) dissolved in N-methylpyrrolidinone (NMP). The slurry composition is adjusted so that 10% by weight of PVDF remains once the NMP solvent is evaporated by drying at 120° C. in air. The slurry is spread on copper foil using a doctor blade spreader and dried at 120° C. in air for several hours. The thickness of a typical electrode is between 100 μm and 200 μm. Small electrode squares 1.2 cm×1.2 cm are cut from the larger electrode and weighed. The weight of the copper foil and incorporated PVDF is subtracted to obtain the active mass of the electrode. 125 μm thick Li foil was used as the anode in these cells. The separator employed was a 50 μm thick microporous polypropylene film. Unless specified otherwise, the electrolyte employed was 1M $LiN(CF_3SO_2)_2$ dissolved in an equal volume mixture of propylene carbonate and ethylene carbonate solvents plus a 12-crown-4 sequestering agent additive to prevent solvent cointercalation. The electrolyte was forced into the separator and the boron-carbon electrode using a vacuum/pressure cycle prior to closure.

Cells were then charged and discharged using constant current between voltage limits of 0.01 V and 2.5 V. The currents were chosen so that the current, I, in Amperes was $$I = \frac{\text{active mass}(g) \times .370(1.0 \cdot 2z)Ah/g}{100h}$$

$$= \text{active mass}(g) \times .00370(1 + 0.2z) \text{Amperes}$$

In this way, the current was selected so that the time taken to change x by 1 in the test compound $Li_x(B_zC_{1-z})_6$ was approximately 100 hours, assuming no parasitic side reactions.

After lithiation, the formula $Li_{x+\Delta x}(B_zC_{1-z})_6$ is used to represent the invention compounds, again where $\Delta x$ refers to the reversible capacity of the material. The reversible cell capacities (in $\Delta x$) were determined from the average of the measured capacities of the first charge and the second discharge of each test cell.

Invention Example 1

$B_zC_{1-z}$ materials of stoichiometry $B_{0.03}C_{0.97}$, $B_{0.08}C_{0.92}$, $B_{0.115}C_{0.885}$ were prepared by CVD and were analyzed as described earlier. In all cases, a flow rate of 16 scc/min of benzene was used at a preparation temperature of 900° C. Table 1 shows the $BCl_3$ flow rate used to prepare each material. The layer spacing (002) of each material was calculated from wide angle x-ray diffraction patterns using standard methods. Laboratory test cells employing each material were constructed and reversible capacities were determined as described earlier. A summary of these values is also included in Table 1.

A steady increase in reversible capacity along with a steady decrease in (002) spacing clearly occurs with increasing z. When z roughly exceeds 0.08, (corresponding to a (002) spacing of 3.41 Å) the reversible capacity is comparable to the theoretical value for graphite ($\Delta x=1$ in $Li_{\Delta x}C_6$). Example material $B_{0.17}C_{0.83}$ represents the maximum possible substitution stoichiometry achieved to date using this method. Here, the reversible capacity is a remarkable 1.18, significantly greater than that of graphite.

Invention Example 2

$B_{0.1}C_{0.9}$ material was prepared and analyzed as in Invention Example 1. Laboratory test cells were constructed and tested as before except that the electrolyte contained no crown ether sequestering agent (ie. electrolyte was 1M $LiN(CF_3SO_2)_2$ in propylene carbonate/ethylene carbonate only). Results are again summarized in Table 1.

The reversible capacity of this material fits appropriately in the progression of results of Invention Example 1. A reversible capacity of $\Delta x=1.08$ was attained.

Comparative Example 1

$B_0C_1$ material was prepared as in Invention Example 1 except no flow of $BCl_3$ gas was used. Laboratory test cells were constructed and tested as before. Results are summarized again in Table 1.

Comparing reversible capacity results to that obtained with $B_{0.17}C_{0.83}$ of Invention Example 1 gives a substantial 84% increase over that of this $B_0C_1$ sample, a similar material with no substituted boron.

Figure 4:
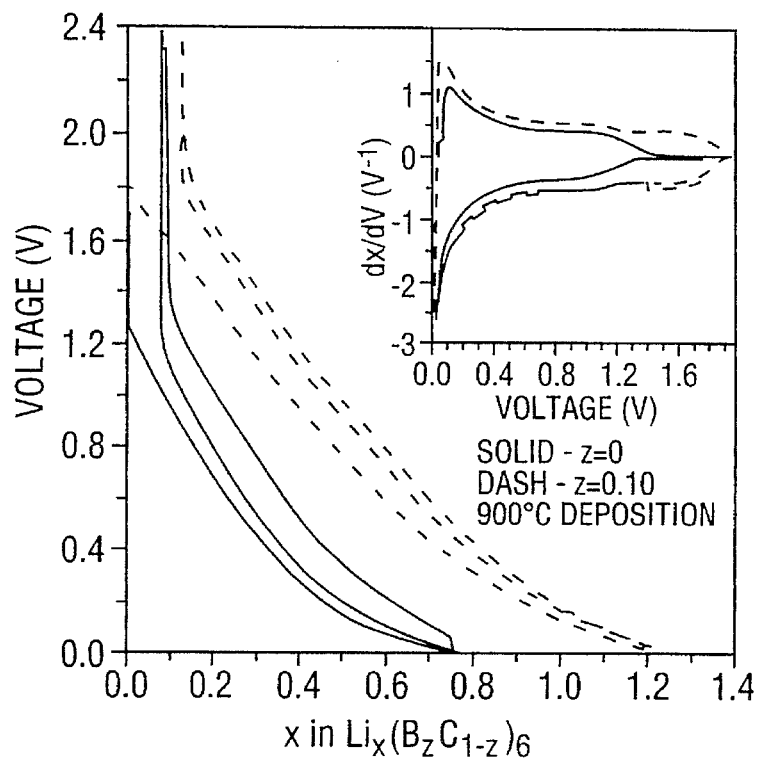
FIG. 4 compares plots of the voltage versus Li stoichiometry results obtained from laboratory test cells made with $B_0C_1$ and with $B_{0.1}C_{0.9}$ example materials.

FIG. 4 shows the voltage versus Li stoichiometry data for this laboratory test cell versus that made with the $B_{0.1}C_{0.9}$ material of Invention Example 2. (Derivatives of these same curves appear in the upper right hand corner). As is apparent in FIG. 4, a significant shift in potential is realized with the substitution of boron into the carbon structure. In addition, the large increase in reversible lithium capacity is also clear. Finally, the irreversible loss of lithium that occurs on the first half cycle is also sufficiently small to allow such material to be practically used in a lithium ion battery employing the same electrolyte. In the prior art of Shu et al. mentioned previously, an unacceptable amount of lithium is lost when using a pure graphite anode in combination with the electrolyte solvents used in this Example.

Comparative Example 2

Figure 5:
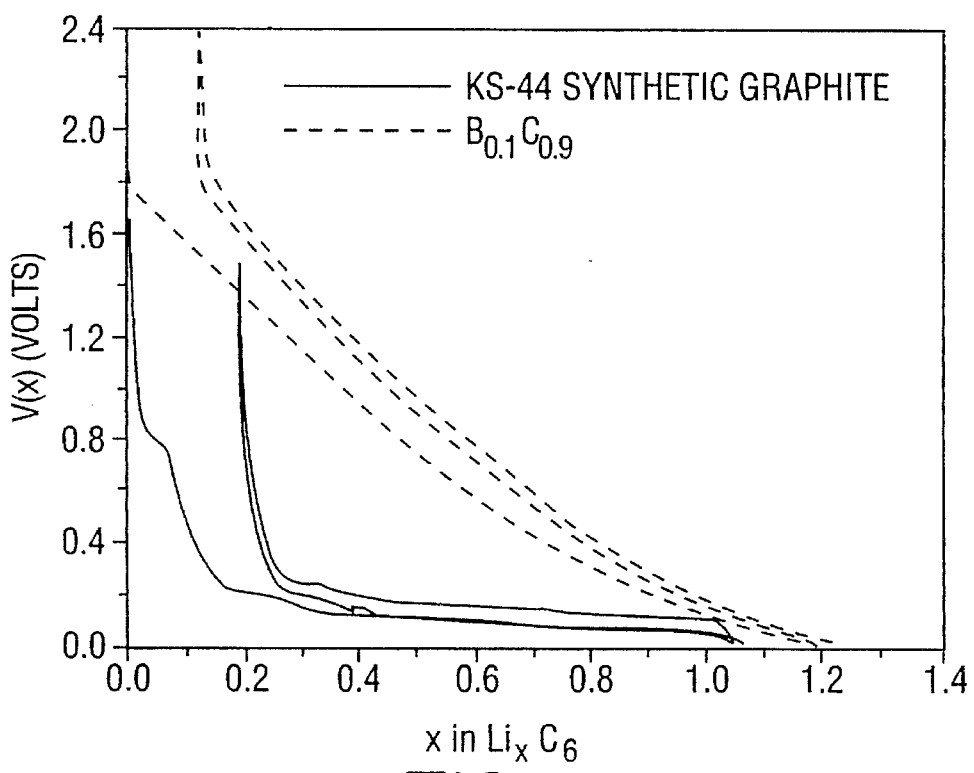
FIG. 5 compares plots of the voltage versus Li stoichiometry results obtained from laboratory test cells made with commercial KS-44 graphite and with invention material $B_{0.1}C_{0.9}$.

An electrochemical cell was prepared and tested as described in Invention Example 1 but using commercial graphite KS-44 from Lonza as the carbon material. FIG. 5 shows the voltage versus stoichiometry data for this material versus that of Invention Example 2. The voltage difference between that of the invention material and pure graphite is apparent. The invention material not only exhibits greater reversible capacity but, in this case, also less irreversible capacity loss even though a sequestering agent is not used in its test cell construction.

TABLE 1

| z in $B_zC_{1-z}$ Material Synthesized | $BCl_3$ Flow rate in Synthesis (scc/min) | (002) Layer Spacing in Å | Reversible Capacity $\Delta x$ in $Li_{x+\Delta x}$ $(B_zC_{1-z})_6$ |
|---|---|---|---|
| 0 | 0 | 3.48 | 0.64 |
| 0.03 | 3 | 3.45 | 0.75 |
| 0.08 | 5 | 3.41 | 0.95 |
| 0.10 | 12 | 3.40 | 1.08 |
| 0.115 | 20 | 3.38 | 1.07 |
| 0.17 | 30 | 3.37 | 1.18 |

Figure 6:
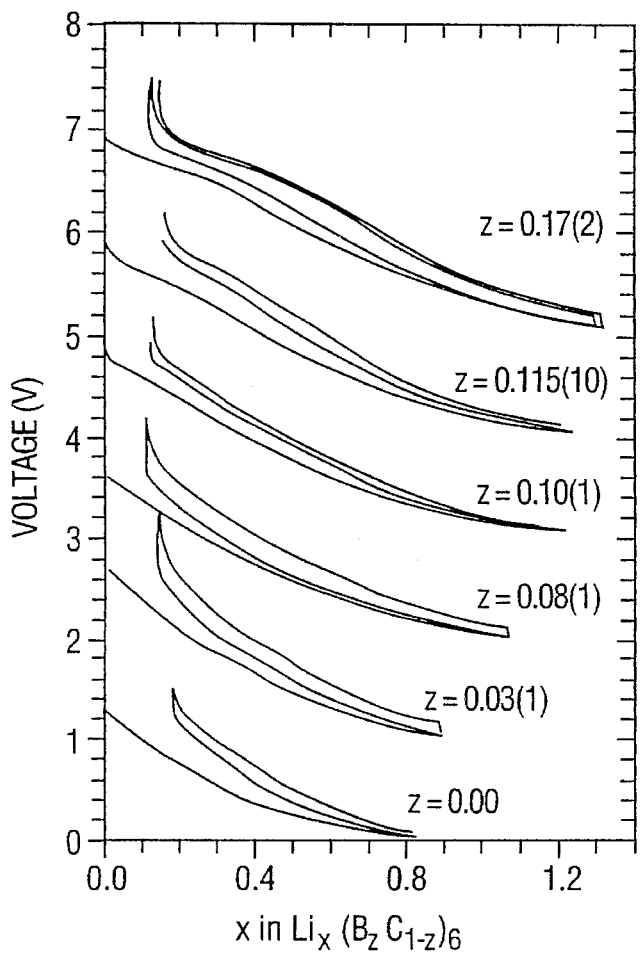
FIG. 6 shows the voltage versus Li stoichiometry curves obtained from all laboratory test cells made with materials synthesized in the examples.
Figure 7:
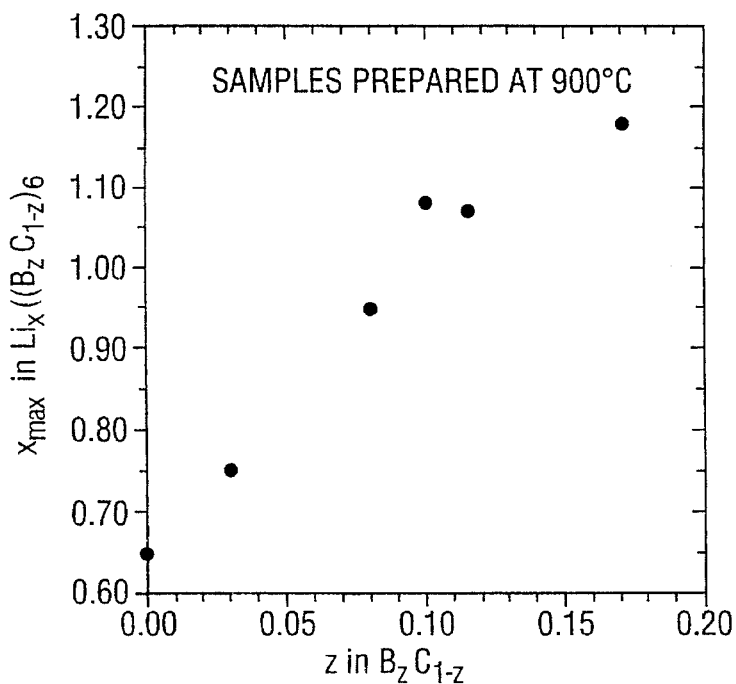
FIG. 7 plots the reversible capacity versus B content for each of the materials synthesized in the examples.

In the way of summary, FIG. 6 shows the voltage versus Li stoichiometry data for all the materials synthesized in the examples given. For clarity to the eye, successive curves are offset in one volt steps in this figure. The progressive shift in potential and capacity increase with z are readily apparent. (The error in the last digit for z is indicated in brackets.) FIG. 7 plots the reversible capacity $\Delta x$ versus z for each of the synthesized materials tested in the examples.

As will be apparent to those skilled in the art in the light of the foregoing disclosure, many alterations and modifications are possible in the practice of this invention without departing from the spirit or scope thereof. As an example, should it be possible to prepare boron substituted carbonaceous materials up to a composition of $BC_3$ (also denoted as $B_{0.25}C_{0.75}$) as indicated in the prior art, further potential shifting and capacity improvements might be expected. Additionally, similar benefits are expected to be realized if other suitable electron acceptors (possibly Be, Al, Mg, Ga, Ca and the like) can be substituted for carbon instead of boron. Accordingly, the scope of the invention is to be construed in accordance with the substance defined by the following claims.

We claim:

1. A lithium ion battery comprising a carbonaceous anode, a cathode and an electrolyte wherein the electroactive material of the anode has an electroactive graphite or disordered graphite structure wherein boron atoms have been substituted for corresponding carbon atoms in said structure, said material having the form $B_zC_{1-z}$, wherein z is a number in the range from greater than 0 and less than or equal to about 0.17.

2. A battery as claimed in claim 1 wherein z is a number in the range from greater than about 0.08 and less than or equal to about 0.17.

3. A battery as claimed in claim 2 wherein the cathode comprises lithiated transition metal oxides, and the electrolyte comprises lithium salts in a mixture of propylene carbonate and ethylene carbonate solvents.

4. A battery as claimed in claim 1 wherein the cathode comprises lithiated transition metal oxides, and the electrolyte comprises lithium salts in a mixture of propylene carbonate and ethylene carbonate solvents.

5. A battery as claimed in claim 1 wherein the cathode comprises lithiated transition metal oxides, and the electrolyte comprises $LiN(CF_3SO_2)_2$ salt in a mixture of propylene carbonate and ethylene carbonate solvents.

6. A lithium ion battery comprising a cathode, a carbonaceous anode and an electrolyte wherein the electroactive material of the anode comprises an electroactive graphite or disordered graphite structure wherein boron atoms have been substituted for corresponding carbon atoms in said structure, said material having the form $B_zC_{1-z}$, wherein z is a number in the range from greater than 0 and less than or equal to about 0.17, and a layer spacing (002) of said material as determined by wide angle x-ray diffraction is in the range from greater than or equal to 3.37Å and less than or equal to 3.45Å.

7. A battery as claimed in claim 6 wherein the layer spacing (002) of said material is in the range from greater than or equal to 3.37 Å and less than or equal to 3.41 Å.

8. A method of causing a shift in potential in a carbonaceous anode material of a lithium ion battery, said anode material having an electroactive graphite or disordered graphite structure, which method consists essentially of substituting boron atoms for corresponding carbon atoms in said structure, so that said structure consists of a boron substituted carbon of the form $B_zC_{1-z}$, wherein z is a number in the range from greater than zero and less than or equal to about 0.17, thereby causing a positive shift in potential of the substituted anode material relative to that of an unsubstituted anode.

9. A method as in claim 8 wherein said carbonaceous anode material is prepared by chemical vapor deposition.

* * * * *

UNITED STATES PATENT AND TRADEMARK OFFICE
CERTIFICATE OF CORRECTION

PATENT NO.   :   5,498,493
DATED        :   March 12, 1996
INVENTOR(S)  :   Dahn et al.

It is certified that error appears in the above-identified patent and that said Letters Patent is hereby corrected as shown below:

Column 1, line 45, "$Li_{x+\Delta}C_6$" should read -- $Li_{x+\Delta x}C_6$ --.

Column 10, line 14 (within claim 6), "337 Å" should read --3.37 Å--.

Signed and Sealed this

Eighteenth Day of June, 1996

Attest:

BRUCE LEHMAN

*Attesting Officer*    *Commissioner of Patents and Trademarks*